United States Patent
Knappke-Bongartz et al.

(10) Patent No.: US 11,453,791 B2
(45) Date of Patent: Sep. 27, 2022

(54) POWDER PARTICULATE DIAMIDE-POLYOLEFIN WAX MIXTURE

(71) Applicant: BYK-Chemie GmbH, Wesel (DE)

(72) Inventors: Christiane Knappke-Bongartz, Wesel (DE); Rene Nagelsdiek, Wesel (DE); Sylvia Bühne, Wesel (DE); Meike Johann, Wesel (DE); Agnetha Klein, Wesel (DE); Andre Tiemann, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 595 days.

(21) Appl. No.: 16/484,878

(22) PCT Filed: Feb. 7, 2018

(86) PCT No.: PCT/EP2018/052992
§ 371 (c)(1),
(2) Date: Aug. 9, 2019

(87) PCT Pub. No.: WO2018/146114
PCT Pub. Date: Aug. 16, 2018

(65) Prior Publication Data
US 2019/0375951 A1    Dec. 12, 2019

(30) Foreign Application Priority Data

Feb. 10, 2017 (EP) ..................... 17155596
May 17, 2017 (EP) ..................... 17171608

(51) Int. Cl.
| | |
|---|---|
| C08K 5/20 | (2006.01) |
| C08K 3/20 | (2006.01) |
| C09D 7/65 | (2018.01) |
| C09D 7/63 | (2018.01) |
| C08F 10/02 | (2006.01) |
| C08J 3/22 | (2006.01) |

(52) U.S. Cl.
CPC ............... C09D 7/65 (2018.01); C08F 10/02 (2013.01); C08J 3/226 (2013.01); C08K 5/20 (2013.01); C09D 7/63 (2018.01); C08K 3/20 (2013.01)

(58) Field of Classification Search
CPC ............... C08K 5/20; C08K 3/20; C09D 7/65
See application file for complete search history.

(56) References Cited

U.S. PATENT DOCUMENTS 3,937,678 A * 2/1976 Yasuda ................. B01J 13/0082
554/56
2011/0200773 A1* 8/2011 Kolditz ............... C08L 23/0815
524/400

FOREIGN PATENT DOCUMENTS

| CN | 103282457 A | 9/2013 | |
|---|---|---|---|
| CN | 104718186 A | 6/2015 | |
| CN | 105408305 A | 3/2016 | |
| JP | 2013-49761 A * | 3/2013 | ............... C09D 5/06 |
| JP | 5756372 B2 | 7/2015 | |
| KR | 10-2005-0087169 A | 8/2005 | |

OTHER PUBLICATIONS

JP 2013-49761 A (Mar. 14, 2013); machine translation. (Year: 2013).*
International Search Report and Written Opinion for International Application No. PCT/EP2018/052992 dated Jul. 13, 2018.

* cited by examiner

*Primary Examiner* — Rip A Lee
(74) *Attorney, Agent, or Firm* — Fitch, Even, Tabin & Flannery LLP

(57) ABSTRACT

The present invention relates to diamide-polyolefin wax mixture comprising one or more diamides (A) and one or more polyolefin waxes (B), where the diamide or diamides (A) possess a structure of the formula $X^1$—CO—NH—Y—NH—CO—$X^2$, in which $X^1$ and $X^2$ are identical or different and are linear or branched, saturated or unsaturated, optionally substituted hydrocarbon radicals having 3 to 29 carbon atoms, and Y is a divalent organic radical which is selected from the group consisting of aliphatic radicals having 2 to 26 carbon atoms, aromatic radicals having 6 to 24 carbon atoms or araliphatic radicals having 7 to 24 carbon atoms, and Y optionally comprises secondary or tertiary amino groups, and the polyolefin wax or waxes (B) carry one or more carboxyl groups and have an acid number of 3 to 50, and are homopolymers or copolymers of at least one ethylenically unsaturated olefin monomer, where the diamide or diamides (A), based on the total weight of the diamide-polyolefin wax mixture, are present in an amount of 20 wt % to less than 40 wt %, the polyolefin wax or waxes (B), based on the total weight of the diamide-polyolefin wax mixture, are present in an amount of above 60 wt % up to 80 wt %, characterized in that the diamide-polyolefin wax mixture at 25° C. is a particulate solid of defined particle size distribution, and the particles comprise both the diamide (A) and the polyolefin wax (B). The invention further relates to the preparation of the aforesaid diamide-polyolefin wax mixture, to the use thereof in liquid compositions, especially as a rheology control agent, to compositions additized accordingly, and to rheology control agents which comprise the diamide-polyolefin wax mixtures.

11 Claims, No Drawings

POWDER PARTICULATE DIAMIDE-POLYOLEFIN WAX MIXTURE

The present invention relates to diamide-polyolefin wax mixtures which are in powder form at room temperature (by which is meant here 23° C.) and to their preparation and use as rheology control agents.

PRIOR ART

Amides, especially bishydroxystearamides, are compounds which are known per se and which find use as rheology control agents in liquid formulations, especially coating materials and liquid resin formulations for producing thermosets. They serve in general both to build up higher film thicknesses and also to improve the antisettling characteristics of the liquid formulations thus additized.

It is likewise known that such amides, in combination with other components, as for example oxidized polyethylene waxes, can be used as rheology control agents.

With liquid formulations additized accordingly, a problem which arises in practice is that, while the rheological properties can be positively influenced by use of corresponding rheology control agents, other relevant properties of the applied formulation or of the cured coating material or crosslinked thermosets produced from it are negatively influenced. These properties include, in particular, the yellowing tendency, the gloss, the adhesion properties, especially the interlayer adhesion, and the surface tension, particularly in relation to coatability or recoatability.

U.S. Pat. No. 3,937,678 describes nonaqueous liquid systems which comprise finely divided solids and possess improved rheological properties. These systems contain firstly an amide of a primary or secondary amine and a carboxylic acid mixture including hydrogenated castor oil fatty acid, and secondly an emulsifiable polyethylene wax. The experimental section of U.S. Pat. No. 3,937,678 uses primarily liquid mixtures, though also less preferred solid mixtures, of separately prepared and/or separately micronized amide component and polyethylene wax component. These separately obtained constituents may be physically premixed or added separately to the target systems. Uniting both components in a single solid particle form is limited in the general part of U.S. Pat. No. 3,937,678, as less preferred, to eutectic compositions, in other words those which are present at the eutectic point.

JP 5756372 describes antisag agents in powder form that are obtained from a diamide and a carboxyl-containing polyolefin wax. The minimum diamide fraction according to the invention in JP 5756372 is 40 wt %, based on the total weight of the antisag agent, since otherwise the antisag properties would not be ensured. Irrespective of the fact that the invention disclosed in JP 5756372 mandatorily starts from a minimum diamide content of 40 wt % in the antisag agent, the preparation of an antisag agent in powder form from only 30 parts by weight of a diamide based on a product of reaction between hexamethylene diamine and hydrogenated castor oil fatty acid, on the one hand, and 70 parts by weight of an oxidized polyethylene, on the other, was unsuccessful (comparative example 15 in JP 5756372). Evidently it was not possible to pulverize the product obtained therein. To what extent this was due to an error in the preparation of the melt or in the subsequent attempt at pulverization with an otherwise unspecified grinding device is not evident from JP 5756372.

It was an object of the present invention, therefore, to provide a diamide-polyolefin wax mixture which as a rheology control agent permits good rheological properties on the part of the additized liquid formulation, serving more particularly as an antisag agent and an antisettling agent, and at the same time does not adversely effect the aforementioned further properties of the applied formulation or of the cured products produced from it.

More particularly it is desirable that optical properties of the formulations produced using the diamide-polyolefin wax mixtures and cured, such as reduced yellowing tendency and good gloss, are present or at least are not adversely affected. Likewise the adhesion properties, particularly the interlayer adhesion, and the surface tension of cured coatings composed of coating materials which comprise the diamide-polyolefin wax mixtures of the invention are not to be adversely affected, or even are to be improved. This is especially so in relation to the coatability or recoatability of cured coatings.

Surprisingly it has been found that this object has been achieved by the provision of a diamide-polyolefin wax mixture comprising or consisting of (A) one or more diamides which possess a structure of the formula (I)

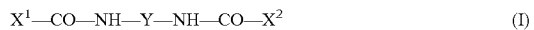

$$X^1\text{—CO—NH—Y—NH—CO—}X^2 \qquad (I)$$

in which $X^1$ and $X^2$ are identical or different and are linear or branched, saturated or unsaturated, optionally substituted hydrocarbon radicals having 3 to 29, preferably 5 to 23, and more preferably 7 to 19 carbon atoms, and at least one of the radicals $X^1$ and $X^2$ carries at least one hydroxyl group, preferably 1 or 2 hydroxyl groups, and more preferably exactly one hydroxyl group, and $X^1$ and/or $X^2$ optionally comprises one or more keto groups;

Y is a divalent organic radical selected from the group consisting of aliphatic radicals having 2 to 26 carbon atoms, aromatic radicals having 6 to 24 carbon atoms or araliphatic radicals having 7 to 24 carbon atoms, and Y optionally comprises secondary or tertiary amino groups, preferably only tertiary amino groups;

(B) one or more carboxyl-containing polyolefin waxes (B) which have an acid number of 3 to 50, preferably 5 to 40, more preferably 8 to 35, very preferably 20 to 25 mg KOH/g, better still 13 to 20 mg KOH/g; and optionally (C) one or more species selected from the group consisting of (i) one or more diamines not falling within the definition of (A), (ii) one or more inorganic salts, metal oxides or semimetal oxides, where the diamide or diamides (A), based on the total weight of the diamide-polyolefin wax mixture, are present in an amount of 20 wt % to less than 40 wt %, preferably 20 to 39 wt %, more preferably 25 to 39 wt %, very preferably more than 30 to 39 wt %, most preferably in an amount of 31 to 39 wt %, such as, for example, 35 to 39 wt %, the polyolefin wax or waxes (B), based on the total weight of the diamide-polyolefin wax mixture, are present in an amount of more than 60 wt % up to 80 wt %, preferably 61 wt % to 80 wt %, more preferably 61 wt % to 75 wt %, very preferably 61 wt % to 70 wt %, most preferably in an amount of 61 wt % to 69 wt %, such as, for example, 61 to 65 wt %, and species (C), are present in an amount of 0 to 20 wt %, preferably 0 to 15 wt %, more preferably 0 to 10 wt %, very preferably 0 to 5 wt %, such as, for example, 1 to 3 wt %, characterized (a) in that the diamide-polyolefin wax mixture at 25° C. is a particulate solid having a particle size distribution of 5 µm≤$d_{90}$≤100 µm, 1 µm≤$d_{50}$≤50 µm and 0.1 µm≤$d_{10}$≤20 µm, preferably having a particle size distribution of 5 µm≤$d_{90}$≤50 µm, 1 µm≤$d_{50}$≤35 µm and 0.1 µm≤$d_{10}$≤15 µm, more preferably having a particle size distribution of 6 µm≤$d_{90}$≤25 µm, 2 µm $d_{50}$≤16 µm and 0.5 µm≤$d_{10}$≤9 µm, most preferably having a particle size distribution of 8 µm $d_{90}$≤18 µm, 4 µm≤$d_{50}$≤11 µm and 1 µm≤$d_{10}$≤4 µm, measured dry by means of laser diffraction technology (with a HELOS instrument with RODOS dry dispersing unit from Sympatec GmbH) in accordance with ISO 13320:2009, (b) the particles comprise (A) and (B) and, if (C) is present at more than 0 wt %, based on the total weight of the diamide-polyolefin wax mixture, (C) as well, and (c) the sum of the weight percentage fractions of the diamides (A) and (C)(i), based on the total weight of the diamide-polyolefin wax mixture, is less than 40 wt %, preferably not more than 39 wt %, more preferably not more than 38 wt %.

Diamides (A)

The diamides (A) may be prepared preferably by condensation reaction of diamines (II)

$$H_2N—Y—NH_2 \qquad (II)$$

with monocarboxylic acids (IIIa) and (IIIb)

$$X^1—COOH \qquad (IIIa)$$

$$X^2—COOH \qquad (IIIb).$$

Alternatively to the monocarboxylic acids (IIIa) and (IIIb) it is also possible for their reactive derivatives, preferably esters (such as glycerides), anhydrides or halides, to be reacted with the amine to form the diamide (A).

The radicals Y, $X^1$, and $X^2$ contained in the formulae (II) and (IIIa) and also (IIIb) correspond to the radicals specified in formula (I). Accordingly, all preferred embodiments of the radicals Y, $X^1$, and $X^2$ that are stated in this specification represent preferred embodiments both for the diamide (A) and for the starting compounds of the formula (II), (IIIa) and (IIIb) that are used for the synthesis, equally, irrespective of whether they are mentioned in connection with formula (I), (II), (IIIa) or (IIIb).

The diamines (II) are preferably aliphatic, aromatic or araliphatic primary diamines, the term "aliphatic" herein including "cycloaliphatic".

The radical Y is a divalent organic radical, preferably a pure hydrocarbon radical, in other words a radical composed exclusively of carbon atoms and hydrogen atoms. A likewise preferred embodiment of the radical Y is a divalent hydrocarbon radical which as well as carbon atoms may also contain tertiary nitrogen atoms (that is, nitrogen atoms possessing three single N—C bonds).

The radical Y may be saturated or unsaturated; preferably it is saturated.

Where the radicals Y are linear aliphatic hydrocarbon radicals, they contain preferably 2 to 20, more preferably 2 to 16, very preferably 2 to 12, better still 2 to 6 or 2 to 8 carbon atoms.

Where the radicals Y are branched aliphatic hydrocarbon radicals, they contain preferably 3 to 20, more preferably 3 to 16, very preferably 3 to 12, better still 3 to 11 or 3 to 8 carbon atoms.

Where the radicals Y are cycloaliphatic hydrocarbon radicals, they contain preferably 3 to 18, more preferably 4 to 15, very preferably 6 to 13, better still 6 to 10 or 6 to 8 carbon atoms.

Where the radicals Y are aromatic hydrocarbon radicals, they contain preferably 6 to 18, more preferably 4 to 15, very preferably 6 to 13, better still 6 to 10 or 6 to 8 carbon atoms. Radicals Y said herein to be aromatic are those in which at least one of the and preferably both $NH_2$ groups in formula (II) are bonded directly to an aromatic ring system.

Where the radicals Y are araliphatic hydrocarbon radicals, these radicals contain preferably 7 to 18, more preferably 7 to 15, very preferably 7 to 13, better still 7 to 10, to 9 or to 8 carbon atoms. Radicals Y said herein to be araliphatic are those in which both $NH_2$ groups in formula (II) are bonded to a carbon atom which does not belong to an aromatic ring system, and yet the radical Y comprises aromatic radicals.

Examples of linear aliphatic diamines (II) are ethylenediamine, 1,2- and 1,3-propanediamine, 1,4-butanediamine, 1,5-pentanediamine, 1,6-hexamethylenediamine, 1,8-octamethylenediamine, and 1,12-dodecamethylenediamine; examples of branched aliphatic diamines (II) are 1,3-diaminoneopentane and 2-butyl-2-ethyl-1,5-pentanediamine; examples of cycloaliphatic diamines (II) are 1,2-, 1,3-, and 1,4-diaminocyclohexane, 1,2-, 1,3-, and 1,4-(aminomethyl) cyclohexane, 4,4'-diaminodicyclohexylmethane, 3,3'-dimethyl-4,4'-diaminodicyclohexylmethane, and isophoronediamine; and examples of aromatic diamines (II) are 4,4'-diaminodiphenylmethane, and of araliphatic diamines (II) are para- and meta-xylylenediamine.

As already mentioned above, the group of the aliphatic diamines (II) also includes diamines of the type $H_2N—R—[NR'—R]_n—NH_2$, where R independently is $(C_1-C_{18})$-alkylene and R' independently is a $(C_1-C_4)$-alkyl group, and n is an integer from 1 to 5. An example thereof is N,N'-bis (3-aminopropyl)methylamine.

Preference is given to using linear aliphatic or araliphatic diamines, more particularly ethylenediamine, 1,4-butanediamine, 1,6-hexamethylenediamine, 1,8-octamethylenediamine, and xylylenediamine (more particularly m-xylylenediamine). Purely aliphatic α,ω-diamines are particularly preferred.

The use of mixtures of the diamines is likewise possible.

The diamines are preferably reacted with one or more of the monocarboxylic acids (IIIa) and (IIIb) identified below, in a condensation reaction, to give the diamides (A).

The monocarboxylic acids (IIIa) and (IIIb) are preferably aliphatic, linear or branched, saturated or unsaturated monocarboxylic acids.

With preference $X^1$ and $X^2$ in the formulae (IIIa) and (IIIb) are linear or branched, saturated or unsaturated hydrocarbon radicals which are optionally substituted by one or more hydroxyl groups and which have 3 to 29, preferably 5 to 23, and more preferably 7 to 19 carbon atoms.

More preferably $X^1$ and $X^2$ in the formulae (IIIa) and (IIIb) are linear saturated or unsaturated hydrocarbon radicals which are optionally substituted by one or more hydroxyl groups, preferably 1 or 2 hydroxyl groups, more preferably exactly one hydroxyl group, and which have 3 to 29, preferably 5 to 23, and more preferably 7 to 19 carbon atoms. Independently of the mandatory presence of at least one hydroxyl group in one of the two radicals $X^1$ and $X^2$, $X^1$ and $X^2$ may comprise one or more keto groups. Where there are one or more keto groups present, it or they may be present in the same radical which carries that at least one hydroxyl group, or, if a hydroxyl-free radical is present, the keto group may also be present in that radical.

It is particularly preferred if the fraction of the carboxylic acids having at last one hydroxyl group, based on the entirety of the monocarboxylic acids used, is at least 50 mol %, preferably at least 70 mol %, more preferably at least 80 mol %, very preferably at least 85%, ideally at least 87 or at least 90 mol %.

Very preferably the monocarboxylic acids $X^1$—COOH and $X^2$—COOH are saturated, linear monocarboxylic acids having exactly one hydroxyl group and 6 to 24 carbon atoms, and preferably the COOH group and the OH group are separated by 5 to 17, more preferably 8 to 15, and very preferably 11 to 13 carbon atoms.

The radicals $X^1$ and $X^2$ may be identical or different.

With particular preference $X^1$ is a $CH_3(CH_2)_5CH(OH)(CH_2)_{10}$ radical and $X^2$ is a radical selected from the group consisting of $CH_3(CH_2)_5CH(OH)(CH_2)_{10}$, $C_{15}H_{31}$, $C_{17}H_{35}$, $C_{17}H_{33}$, $C_9H_{19}$, $C_{11}H_{23}$, $C_7H_{15}$, and $C_5H_{11}$, where more preferably at least 40 mol %, very preferably at least 60 mol %, more preferably still at least 70 mol %, and ideally at least 80 mol %, at least 85 mol % or, better still, at least 90 mol % of the radicals $X^2$ are a $CH_3(CH_2)_5CH(OH)(CH_2)_{10}$ group.

Preferred monocarboxylic acids containing hydroxyl groups are ω-hydroxyhexanoic acid, 12-hydroxylauric acid, 16-hydroxyhexadecanoic acid, 9-hydroxystearic acid, 10-hydroxystearic acid, 12-hydroxystearic acid, 14-hydroxyeicosanic acid, ricinol fatty acid, and hydrogenated ricinol fatty acid.

Especially preferred hydroxyl-functional carboxylic acids are 12-hydroxystearic acid and/or hydrogenated ricinol fatty acid.

Preferred non-hydroxy-functional monocarboxylic acids, which may be used in combination with the hydroxy-functional monocarboxylic acids, are palmitic acid, stearic acid, oleic acid, capric acid, lauric acid, caproic acid, n-octanoic acid, behenic acid, and montanic acid.

Particularly preferred non-hydroxyl-functional monocarboxylic acids are stearic acid and oleic acid.

The diamide component (A) is customarily solid at room temperature (23° C.).

Mixtures with less than 20 wt % of diamide component (A), based on the total weight of the diamide-polyolefin wax (A) mixture, can no longer be sufficiently well comminuted, more particularly converted into a powder form, and consequently the material can no longer be brought into the form appropriate for the end use.

Mixtures with 40 wt % or more, in total, of the diamide component (A) plus the optionally included species (C)(i), based on the total weight of the diamide-polyolefin wax mixture, lead in use to impaired coating properties, such as impaired adhesion, increase yellowing tendency, and higher slip resistance, for example.

Polyolefin Waxes (B)

As is inherent in the term "wax", the polyolefin waxes (B) containing carboxyl groups are substances which are solid at room temperature (23° C.).

The term "olefin" herein embraces, in particular, the alkenes that are typical of polyolefins, preferably alkenes having 2 to 8, more preferably alkenes having 2 to 6, and very preferably alkenes having 2 to 4 carbon atoms, more preferably with a terminal double bond. Preferred representatives in the context of the present invention are ethylene, propylene, 1-butene, and isobutene. Particularly preferred olefin monomers in the context of the present invention are ethylene and propylene.

The term "polyolefin" refers in general to homopolymers of a single kind of an olefin monomer (ethylene homopolymers, for example), or copolymers of two or more olefin monomers (for example, polymers of mixtures comprising or consisting of ethylene, propylene, 1-butene and/or isobutene). The polyolefins thus comprise one or more kinds of olefin monomers and, accordingly, are homopolymers or copolymers. Additionally, however, they may also comprise one or more ethylenically unsaturated monomers different from olefin monomers, more particularly ethylenically unsaturated monomers carrying carboxylic acid groups, in copolymerized or grafted-on form. Where ethylenically unsaturated monomers different from the olefin monomers and having carboxyl groups or carboxylic anhydride groups are used for copolymerization or grafting, they are used in an amount such that the polyolefin wax (B) containing carboxyl groups possesses an acid number in the range from 3 to 50, preferably 5 to 40, more preferably 8 to 35, very preferably 10 to 25, and especially preferably 13 to 20 mg KOH/g.

The polyolefin waxes (B) of the present invention that contain carboxyl groups preferably satisfy the definition of waxes according to the Deutsche Gesellschaft für Fettwissenschaft [German Society for Fat Science; DGF] (DGF-Einheitsmethode [standard method] M-I 1 (75)). Waxes, accordingly, at 20° C. are kneadable and firm to brittly hard; they possess a coarse to finely crystalline structure, are, in terms of color, translucent to opaque but not glasslike, melt at temperature above 40° C. without decomposition, are slightly liquid (of low viscosity) a little above the melting point, have a highly temperature-dependent consistency and solubility, and can be polished under gentle pressure.

The polyolefin waxes (B) containing carboxyl groups are obtained preferably according to one of the following three different methods:
1. by oxidation of apolar polyolefin waxes, especially apolar polyethylene waxes (melt oxidation), or by oxidative degradation of polyolefin plastics such as, in particular, polyethylene plastics;
2. by polymerization, preferably radical polymerization, and more preferably radical high-pressure polymerization, of olefins, especially ethylene and/or propylene, with carboxyl-containing monomers such as acrylic acid, for example; or
3. by radical grafting of carboxyl-containing unsaturated monomers such as maleic anhydride, for example, onto apolar polyolefin waxes such as, in particular, polyethylene waxes and/or polypropylene waxes.

Consequently, preferred polyolefin waxes (B) containing carboxyl groups are those obtained (a) by oxidation, especially melt oxidation, of polyolefin waxes, preferably apolar polyolefin waxes, (b) by oxidative degradation of polyolefin plastics, (c) by polymerization, preferably radical polymerization, and more preferably radical high-pressure polymerization of olefins with carboxyl-containing or carboxylic anhydride-containing ethylenically unsaturated monomers, or (d) by grafting, especially radical grafting, of carboxyl-containing or carboxylic anhydride group-containing ethylenically unsaturated monomers onto polyolefin waxes, preferably apolar polyolefin waxes.

The polyolefin wax (B) containing carboxyl groups is preferably a homopolymer or copolymer of at least one olefin monomer, preferably of an α-olefin.

The polyolefin waxes (B) are preferably selected from the group consisting of oxidized polyethylene waxes, oxidized polypropylene waxes, oxidized poly(ethylene-co-propylene) waxes, and—different from the aforesaid copolymers—oxidized ethylene-α-olefin copolymers, ethylene-(meth) acrylic acid copolymers, and polymers of ethylene and/or propylene which have been grafted for example with maleic anhydride (i.e., converted into the hydrolyzed form, thus carrying free COOH groups). For the grafting it is of course also possible for other ethylenically unsaturated acids such as acrylic acid to be employed. For all polyolefin waxes (B), of course, the above-specific provisos regarding the acid number of the polyolefin waxes (B) must be fulfilled.

The carboxyl-containing polyolefin wax (B) is preferably an ethylene homopolymer or copolymer which is obtainable either by polymerization of exclusively ethylene or by copolymerization of ethylene and at least one further alpha-olefin, preferably propylene, where the fraction of ethylene, based on the total mass of ethylene and further alpha-olefins, is preferably at least 60 wt %, better still at least 80 wt %, and where the ethylene homopolymer or copolymer is provided preferably by an oxidative procedure with oxygen-containing functional groups, including more particularly at least one COOH group. Very preferably the polymer in question is a corresponding ethylene homopolymer equipped with COOH groups.

The polyolefin waxes (B) preferably possess
i. a density of 0.85 to 1.05 g/cm$^3$ at 23° C., more preferably of 0.92 to 0.97 g/cm$^3$, determined in accordance with EN ISO 1183-1:2012,
ii. a dropping point of 85 to 145° C., preferably of 90 to 130° C., more preferably of 95 to 120° C., and very preferably of 97 to 112° C., determined in accordance with ASTM D-3954: 94(2010).

Products of these kinds are available, for example, under the trade names A-C 680, A-C 629 or A-C 673P from Honeywell, as Viscowax 252 and Viscowax 253 from Leuna Innospec, as Deurex E040 from Deurex, as Licowax PED 521, Licowax PED 522 or Licolub H 12 from Clariant, or as Epolene E 14 from Westlake.

Optional Species (C)

The diamide-polyolefin wax mixture of the invention, in addition to components (A) and (B), may further comprise up to 20 wt % of one or more species (C), which are species different from (A) and (B) and which are selected from the group consisting of:
(i) one or more diamides not falling within the definition of (A), and
(ii) one or more inorganic salts, metal oxides or semimetal oxides.

Species (C)(i) present are preferably diamides which possess a structure of the formula (II)

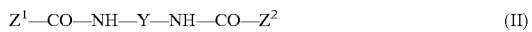

$$Z^1—CO—NH—Y—NH—CO—Z^2 \quad \text{(II)}$$

in which
$Z^1$ and $Z^2$ are free from hydroxyl groups, are identical or different, and are linear or branched, saturated or unsaturated, optionally substituted hydrocarbon radicals having 3 to 29, preferably 5 to 23, and more preferably 7 to 19 carbon atoms, and the radicals $Z^1$ and $Z^2$ optionally contain keto groups,
Y is a divalent organic radical which is selected from the group consisting of aliphatic radicals having 2 to 26 carbon atoms, aromatic radicals having 6 to 24 carbon atoms or araliphatic radicals having 7 to 24 carbon atoms, and Y optionally contains secondary or tertiary amino groups, preferably only tertiary amino groups.

Species (C)(ii) present are preferably those inorganic salts, metal oxides or semimetal oxides which typically find use as micronizing aids or free-flow aids. They are preferably selected from the group consisting of silicas, the oxides, hydroxides, oxide hydroxides, carbonates, sulfates, phosphates, and silicates of the nonradioactive elements of main group 2 of the periodic table of the elements, and of aluminum. Preferred elements of main group 2 of the periodic table of the elements are magnesium, calcium, strontium, and barium; especially preferred are magnesium, calcium, and barium. Examples of suitable inorganic salts and metal oxides are calcium carbonate, magnesium carbonate, calcium magnesium carbonate (dolomite), magnesium oxide, barium sulfate, and calcium phosphates. The aluminum salts include more particularly aluminum oxide, aluminum hydroxide, and aluminum oxide hydroxide. Silicas include fumed silicas and precipitated silicas, and silicates include, in particular, aluminosilicates or talc. Irrespective of this it is possible for all inorganic salts, metal oxides or semimetal oxides also to comprise other nonradioactive elements of the period table of the elements, especially those from main group 1 such as preferably lithium, sodium, and potassium, especially in conjunction with silicates. The species (C)(ii) are generally selected such that they are very largely and preferably completely chemically inert with respect to other constituents of the diamide-polyolefin wax mixture. The species (C)(ii) are generally also selected such that they do not absorb any moisture, and more particularly do not exhibit hygroscopic behavior or react with water to form species that are not inert with respect to the other constituents of the diamide-polyolefin wax mixture.

The species (C) are customarily solid at room temperature (23° C.).

Physical Characteristics and Form of the Mixture of the Invention

The diamide-polyolefin wax mixture of the invention, in accordance with the claim, is a solid in powder form at 23° C. The diamide-polyolefin wax mixture is preferably free or substantially free from organic solvents. The designation "substantially free from organic solvents" means preferably that the amount of organic solvents in the diamide-polyolefin wax mixture of the invention is less than 5 wt %, more preferably less than 3 wt %, very preferably less than 1 wt %, and especially preferably less than 0.5 wt %, based on the total weight of the diamide-polyolefin wax mixture (including the solvent content).

In accordance with the invention the diamide-polyolefin wax mixture at 25° C. is a particulate solid having a particle size distribution of 5 µm≤$d_{90}$≤100 µm, 1 µm≤$d_{50}$≤50 µm and 0.1 µm≤$d_{10}$≤20 µm. Preferably with a particle size distribution of 5 µm≤$d_{90}$≤50 µm, 1 µm≤$d_{50}$≤35 µm and 0.1 µm≤$d_{10}$≤15 µm, more preferably with a particle size distribution of 6 µm≤$d_{90}$≤25 µm, 2 µm≤$d_{50}$≤16 µm and 0.5 µm≤$d_{10}$≤9 µm, and ideally with a particle size distribution of 8 µm≤$d_{90}$≤18 µm, 4 µm≤$d_{50}$≤11 µm and 1 µm≤$d_{10}$≤4 µm, in each case measured dry by means of laser diffraction (with a HELOS\BF instrument with RODOS dry dispersing unit from Sympatec GmbH, using the Sympatec Windox 5.7.1.0 software and employing the Fraunhofer theory). The designations of the above-specified volumetric diameters d as $d_{10}$, $d_{50}$, and $d_{90}$ mean that 10%, 50%, and 90%, respectively, of the particles are smaller than the specified value. The value $d_{50}$ therefore represents the median particle size.

If a $d_{90}$ of 100 µm is exceeded, there is a drop in the rheological activity of the mixture, and in particular there is an increase in the activation time in the target system and there is increased formation of unwanted bittiness, when the target system is a coating material. If the $d_{10}$ value is to be below 0.1 µm, this is associated with a high level of technical cost and complexity, which not only is uneconomic in general for the intended applications but also brings with it disadvantages in respect of manageability (operation with fine dusts).

Preparation Process for the Particulate Diamide-Polyethylene Wax Mixture

The mixing of the diamide component (A), the carboxyl-containing polyolefin component (B), and, where used, the species (C) takes place preferably in the melt. This means that the components (A), (B), and optionally (C)(i) are homogenized in the liquid state, optionally species (C)(ii) are introduced into the melt, and the homogenized melt is then cooled. Homogenization in the melt may take place, for example, in a tank with stirring, or on a mixing extruder. Thereafter the solidified melt is customarily first coarsely comminuted and subsequently converted by a suitable grinding operation into a particulate product, preferably a product in powder form, which possesses the particle size distribution specified above. In the grinding operation there is particular preference to use a fluidized-bed opposed-jet mill with classifying. Possible alternative mills are spiral jet mills and rotor impact mills with classifying unit. Also possible in principle is cryogenic grinding, or the use of other mills comparable in terms of their grinding efficiency and grinding power with the aforementioned mills. It is advantageous if the grinding operation takes place under an inert gas atmosphere such as, for example, nitrogen atmosphere, or under a lean air atmosphere. By lean air are meant gas mixtures which comprise the customary constituents of air, but a lower oxygen fraction and a higher nitrogen fraction. Technically, therefore, lean air is preferably produced by mixing air and nitrogen.

Usage Systems

The rheology control agents of the invention consist of or comprise the diamide-polyolefin wax mixtures of the invention and are suitable preferably for the rheology control of liquid systems, more particularly of solvent-containing and solvent-free formulations.

The invention also relates to the use of the preparations of the invention for the rheology control of a liquid composition. This liquid composition takes the form preferably of a coating material, more particularly a paint or varnish, a plastics formulation, a pigment paste (e.g., effect pigment paste), a sealant formulation, a cosmetic, a ceramic formulation, an adhesive formulation, liquid formulations for use in gas and oil extraction, a cleaning product, a casting compound, a building material formulation, a lubricant, a troweling compound, a liquid formulation for producing electrical components and circuits (in the context, for example, of "printed electronics"), a liquid formulation for use in energy storage media (batteries, for example), a metalworking fluid, the form of a spraying agent (e.g., as a deposition aid in crop protection products), a printing ink or a liquid ink—an inkjet ink, for example.

The present invention lastly relates to a liquid composition which takes the form of a coating material, a plastics formulation, a pigment paste (e.g., effect pigment paste), a sealant formulation, a cosmetic, a ceramic formulation, an adhesive formulation, liquid formulations for use in gas and oil extraction, liquid formulations for producing electrical components and circuits, liquid formulations for use in energy storage media, a cleaning product, a casting compound, a building material formulation, a lubricant, a troweling compound, a wax emulsion, a metalworking fluid, the form of a spraying agent, a printing ink or a liquid ink and which comprises preferably 0.1 to 10 wt % of the rheology control agent of the invention, based on the total weight of the formulation. The invention preferably relates to a liquid composition (i.e., a formulation) which 0.2 to 5 wt %, more preferably 0.4 to 3 wt %, based on the total weight of the liquid composition, including the rheology control agent of the invention.

Particularly preferred in this context is the use of the preparation of the invention as a rheology control agent for the rheology control of paints and varnishes, printing inks, liquid inks (such as inkjet inks, for example), plastics formulations, cosmetics preparations, cleaning products, building material formulations, metalworking fluids, lubricants, greases and/or adhesives, and also in formulations which are employed in the extraction of natural gas and petroleum.

The paints and varnishes, printing inks and liquid inks, especially inkjet inks, are preferably solvent-containing and solvent-free paints and varnishes, printing inks and liquid inks, especially inkjet inks. Paints and varnishes can be employed across a very wide variety of fields, including the sectors of automobile paints, architectural paints, protective coatings, including those for the coating of ships and bridges, as can-coating and coil-coating materials, wood and furniture varnishes, industrial coatings, coating materials for the coating of plastics, as wire enamels, coating materials for the coating of foods and seed, and also as what are called color resists, which are employed for color filters, in liquid-crystal displays, for example. Especially advantageous is the use of the diamide-polyolefin wax mixture of the invention in anticorrosion coating material compositions which are employed in particular in the production of anticorrosion coatings. The coatings sector of use also includes pasty materials which in general have a very high solids fraction and a low fraction of liquid components, examples being those known as pigment pastes or else pastes based on finely divided metal particles or metal powders such as those, for example, based on silver, copper, zinc, aluminum, bronze, and brass that are employed, for example, as metallic effect pigments; pearlescent pigments and interference pigments as well may be employed here.

In the case of the plastics formulations, those in question may be (liquid) starting materials for producing plastics materials, which are reacted preferably by a chemical cross-linking procedure ("curing" to form a thermoset). Preferred plastics preparations are unsaturated polyester resins, vinyl ester reins, acrylate resins, epoxy resins, polyurethane resins, formaldehyde resins (such as melamine-formaldehyde or urea-formaldehyde). These preparations may be cured under a wide variety of different conditions, as for example at room temperature (cold-curing systems) or at elevated temperature (hot-curing systems), optionally also with application of pressure ("closed mold" application, sheet molding compound or bulk molding compound). The plastics formulations also include PVC plastisols.

The cosmetic preparations may be diverse, preferably nonaqueous, liquid compositions which are employed in the personal care sector or else the health care sector, including, for example, lotions, creams, pastes, foams, gels, or drugs in gel formulation, shampoos, liquid soaps, nail varnishes, lipsticks, and hair colorants.

The primary aim of using the rheology control agents of the invention in the case of the spraying agents (as deposition aids) is that of drift reduction or drift avoidance, preferably in nonaqueous spraying agents.

In the case of the metalworking fluids, the systems in question may be solvent-containing and solvent-free systems. Examples thereof are cutting fluids, drilling fluids (as used in metalworking), parting agents (for example, for aluminum diecasting and foundry applications), foundry washes (foundry coatings), and fluids for the surface treatment of metals (for example, surface finishing, surface cleaning, and galvanizing).

In the case of the lubricants, the materials in question—preferably solvent-containing and solvent-free—are those which are used for lubrication, in other words which serve to reduce friction and wear, and also to transmit force, cool, dampen vibrations, provide sealing, and protect against corrosion—liquid lubricants are preferred here.

The liquid formulations for use in gas and oil extraction are preferably solvent-containing and solvent-free liquids which are employed in the exploitation of a reservoir or else in the subsequent emptying thereof. Preferred here are drilling muds, also referred to as drilling fluids. One field of use is that of oil-based drilling muds.

Cleaning products, preferably here nonaqueous cleaning products, may serve for the cleaning of any of a very wide variety of different objects. They bring about or assist the removal of contaminants, residues, and adhering material. The cleaning products also include detergents (especially for the cleaning of textiles, precursors thereof, and leather), polishes and laundering agents, and also personal care products.

The adhesives may be any process materials that are liquid under process conditions and that are able to join adherends by surface adhesion and inner strength. Preference here is given to solvent-containing and solvent-free adhesives.

In the text below, the invention is elucidated in more detail with examples.

EXAMPLES

Preparation of the Inventive Diamide-Polyolefin Wax Mixtures

Preparation of Diamide Component (A)

General Preparation Protocol

Two equivalents of acid are combined with one equivalent of diamine in the liquid state. The mixture is heated to 180° C. and the water of reaction formed is separated off. When the reaction is at an end, the material is poured hot onto a stable surface. After cooling, the material is broken into pieces.

Diamide 1

842 g (2.72 mol) of 12-hydroxystearic acid were melted at 85° C. in a laboratory reactor. 197 g of an 80% solution of hexamethylenediamine in water (corresponding to 1.36 mol of hexamethylenediamine) were metered via a dropping funnel. After the end of the addition, separation of the water was commenced. The temperature was raised in 10° C. steps until it reached 180° C. When water can no longer be separated off, reduced pressure was applied for 1 hour. The progress of reaction was monitored by determination of the amine number and the acid number (in N-ethylpyrrolidone as solvent for the titration). The final value of the acid number was 1.7 mg KOH/g and the amine number was <1 mg KOH/g. After the end of the reaction, the reduced pressure was removed and the product melt was poured onto aluminum foil. When the product had cooled, it was broken into pieces.

Diamide 2

228 g (0.735 mol) of 12-hydroxystearic acid were melted at 85° C. in a laboratory reactor. 22.1 g (0.368 mol) of ethylenediamine were metered in via a dropping funnel. After the end of the addition, the reactor contents were heated at 110° C. for 1 hour. Subsequently the temperature was raised to 180° C. and water was separated off (6 hours). The progress of the reaction was monitored by determination of the amine number and the acid number (in N-ethylpyrrolidone as solvent for the titration). The final value of the acid number was 1.7 mg KOH/g and the amine number was 1.1 mg KOH/g. After the end of the reaction, the product melt was poured onto aluminum foil. When the product cooled, it was broken into pieces.

The acid number (AN) was determined in accordance with DIN EN ISO 2114 (June 2002), using N-ethylpyrrolidone (NEP) as solvent for the titration. The sample (2.0 to 3.0 grams) is weighed to an accuracy of 0.1 mg into an 80 ml beaker and dissolved hot in 25 ml of NEP (around 100° C.) on a magnetic stirrer. After dissolution has taken place, 25 ml of NEP are added. The sample is placed on a magnetic stirrer, the electrode is immersed thoroughly, a few drops of phenolphthalein are added, and the system is titrated hot with 0.1N ethanolic KOH.

The amine number (AmN) was determined in accordance with DIN 53176 (November 2002), using N-ethylpyrrolidone (NEP) as solvent for the titration. The sample (2.0 to 3.0 grams) is weighed to an accuracy of 0.1 mg into an 80 ml beaker and dissolved hot in 25 ml of NEP (around 100° C.) on a magnetic stirrer. After dissolution has taken place, 25 ml of NEP are added. The sample is placed on a magnetic stirrer, the electrode is immersed thoroughly, a few drops of bromophenol blue are added, and the system is titrated hot with 0.1N isopropanolic HCl.

Preparation of an Inventive Combination of Diamide Component (A) and Carboxyl-Containing Polyolefin Wax (B)

General Preparation Protocol

The diamide component (A) and the polyolefin component (B) were melted together in a laboratory reactor at 150° C. and homogenized in the melt by stirring by means of a stirring rod. The melt was poured into a silicone mold to cool. The cooled material was broken into pieces, subjected to coarse preliminary grinding with a mechanical mill for around 2 minutes (Thermomix, manufacturer: Vorwerk, model TM31-1), and subsequently micronized on a fluidized-bed opposed-jet mill (model: 100-AFG, manufacturer: Hosokawa Alpine, rotary speed of classifier: 8000 rpm, internal pressure of classifier: 0.0 mbar, grinding air: 6.0 mbar; grinding gas: nitrogen).

TABLE A

Inventive examples (examples IE1-IE5) and noninventive comparative examples (comparative examples CE6-CE8)

| Inventive examples IE and comparative examples CE | Component A: diamide 1 | Component B: oxidized polyethylene wax* |
|---|---|---|
| IE1 | 80 g (20%) | 320 g (80%) |
| IE 2 | 120 g (30%) | 280 g (70%) |
| IE 3 | 140 g (35%) | 260 g (65%) |
| IE 4 | 570 g (38%) | 930 g (62%) |
| IE 5 | 156 g (39%) | 244 g (61%) |
| CE6 | 400 g (40%) | 600 g (60%) |
| CE7 | 175 g (50%) | 175 g (50%) |
| CE8 | 284.1 g (60%) | 189.4 g (40%) |

*having an acid number of 17 mg KOH/g to DIN EN ISO 2114 (June 2002), a density at 23° C. of 0.95 g/cm³ to EN ISO 1183-1: 2012, a dropping point of 104° C. to ASTM D-3954-94(2010), and a viscosity of 350 mPas at (120° C.) to DIN 53019-1: 2008-09.

Performance Results

TABLE B

Raw materials used

| Name | Description | Manufacturer |
|---|---|---|
| Setalux 1756 VV-56 | Acrylate binder | Nuplex Resins |
| Disperbyk-118 | Wetting and dispersing additive | BYK Chemie GmbH |
| Shellsol A | Aromatic hydrocarbon C9-C10 | Overlack AG |
| Xylene | | Overlack AG |
| Kronos 2360 | Titanium dioxide | KRONOS TITAN GmbH |
| Setamine US-138-BB-70 | Melamine resin | Nuplex Resins |
| BYK-310 | Surface additive | BYK Chemie GmbH |
| Epikote 828 | Bisphenol A epoxy binder | Hexion Inc. |
| BYK-9076 | Wetting and dispersing additive | BYK Chemie GmbH |
| BYK-A 530 | Deaerating agent | BYK Chemie GmbH |
| Ti-Pure R960 | Titanium dioxide | Chemours Company |
| Talkum Luzenac 20M2 | Talc | Imerys Talc Luzenac France |
| EWO | Heavy spar | Sachtleben Chemie GmbH |
| Epikure 3155 | Polyamide epoxy hardener | Hexion Inc. |

Coatings Test System 1

The active ingredient combinations were incorporated into the following coating formulation: Baking varnish based on Setalux 1756 VV-56/Setamine US-138-BB-70

TABLE C

Formulation

| Millbase: | |
|---|---|
| Setalux 1756 VV-65 | 18.6 |
| DIS-118 | 0.6 |
| Shellsol A | 2.1 |
| Xylene | 2.0 |
| Kronos 2360 | 25.2 |
| Composition in powder form | 1.0 |

Dispermat, 50° C., 30 min., 18 m/s, toothed disc

TABLE C-continued

Formulation

| Letdown: | |
|---|---|
| Setalux 1756 VV-65 | 30.0 |
| Setamine US-138-BB-70 | 16.0 |
| Shellsol A | 3.0 |
| Xylene | 2.3 |
| BYK-310 | 0.2 |
| | 101.0 |

Producing the White-Pigmented Baking Varnish According to the Formula Specified in Table C The combinations in powder form were incorporated during the dispersion of the millbase (30 minutes) at an activation temperature of 50° C. After production, the varnishes were stored at room temperature (23° C.) overnight, after which the respective tests were carried out. For this purpose, the baking varnish was applied in a wet film thickness of 150 μm to steel panels, coated with a cathodic electrocoat material and measuring 10×20 cm, from Krüppel GmbH & Co. KG in Krefeld, using a four-way coatings applicator with a width of 60 mm from Byk Gardner. After a flashing time of 15 minutes at room temperature, the varnish was subsequently baked in the FDL115 paint drying oven from Binder (25 minutes; 140° C.). The drawdowns were stored for a day at room temperature (23° C.) before the respective tests took place.

Measurement Methods and Apparatus

Yellowness

The yellowness was determined using the Color-Guide 45°/0° from BYK Gardner one day after the baking of the white varnish, and also one day after overbaking or UV exposure. For this purpose the YE 98 value was measured and contrasted.

UV Exposure

The UV exposure for determining the effect on the yellowness was carried out on the UV unit from IST. For this purpose the varnish drawdowns were exposed 10 times at a speed of 3 m/min to gallium and mercury lamps each of 120 W/cm. This was followed by the measurement of the YE 98 values of the exposed samples.

Thermal Exposure

The thermal exposure for determining the effect on the yellowness was carried out by overbaking the varnish drawdowns, already baked, at 180° C. in the FDL 115 paint drying oven from Binder for 30 minutes. This was followed by measurement of the YE 98 values of the exposed samples.

Slip Resistance

The slip resistance was measured by means of a slip meter (in-house construction from Byk Gardner). In this test a 500 g weight on a felt platelet is drawn at a speed of 50 mm/s over the varnish film. A force meter determines the force which is required to do this. The reduction in the slip resistance is calculated subsequently relative to the blank sample.

Polar Component of the Surface Energy

The polar component of the surface energy was determined by means of contact angle measurements on a Krüss DAS 100 contact angle instrument from Krüss in accordance with DIN 55660-1, -2 2011-12 and -5 2012-04. To calculate the polar components, the measured contact angles of five measurement liquids (water, glycerol, ethylene glycol, 1-octanol, and n-dodecane) were used.

Cross-Cut Test

Varnish adhesion was assessed by means of the DIN EN ISO 2409 2013-06 cross-cut testing, using the 1 mm multicutter from Byk Gardner.

Interlayer Adhesion

The interlayer adhesion was conducted by the pull-off test for assessing the adhesive strength in accordance with DIN EN ISO 4624, 2014-06, using the Posi Test AT-M digital from DeFelsko. For this, two films of varnish each with a wet film thickness of 150 μm were applied one above the other, with the second film being slightly colored by addition of a drop of blue paste, in order to permit better evaluation of the fracture mode. After the varnish films have been stored, after baking for a day, at room temperature (23° C.), 20 mm aluminum dies were bonded on using UHU300 2-part adhesive. The pull-off test took place 24 hours after the adhering of the dies, after storage of the samples at room temperature (23° C.). The assessment of the fracture mode (fracture of substrate to the first film/fracture of the first film to the second film/fracture of the adhesive) took place in accordance with the DIN.

TABLE 1

Performance results on the yellowness fresh (after baking)

| Additive | Yellowness YE 98 (fresh) | Yellowness YE 98 (after 10 × UV) |
|---|---|---|
| Control | 1.45 | 3.00 |
| IE1 | 1.41 | 3.16 |
| IE2 | 1.53 | 3.52 |
| IE3 | 1.69 | ./. |
| IE4 | 1.61 | 3.59 |
| IE5 | 1.67 | 3.42 |
| CE6 | 1.89 | 4.18 |
| CE8 | 2.35 | ./. |

From the results it is apparent that the yellowness of the fresh coating is not substantially impaired by the inventive active ingredient combinations IE1 to IE5, whereas in the case of the noninventive, comparative examples CE6 and CE8 the yellowing that occurs is stronger.

From the results it is apparent that the yellowness after UV exposure is only slightly increased when using the inventive active ingredient combinations IE1, IE2, IE4, and IE5, whereas in the case of the noninventive, comparative example CE6 the yellowing that occurs is much stronger.

TABLE 2

Performance results on the yellowness after overbaking

| Additive | Yellowness YE 98 (after 30 min at 180° C.) |
|---|---|
| Control | 2.44 |
| IE1 | 2.34 |
| IE4 | 2.37 |
| IE5 | 2.49 |
| CE6 | 2.88 |
| CE8 | 3.42 |

From the results it is apparent that the yellowness after thermal exposure is not substantially altered when using the inventive active ingredient combinations IE1, IE4, and IE5, whereas in the case of the noninventive, comparative examples CE6 and CE8 the yellowing that occurs is much stronger.

TABLE 3

Performance results on the slip resistance

| Additive | Reduction in slip resistance in comparison to control [%] |
|---|---|
| Control | 0 |
| IE2 | 32 |
| IE4 | 29 |
| CE6 | 16 |

From the results it is apparent that the slip resistance can be reduced, advantageously, much more greatly by using the inventive active ingredient combinations IE2 and IE4 than in the case of the noninventive, comparative example CE6.

TABLE 4

Performance results on the surface energy (polar component) determined by contact angle measurements

| Additive | Polar component of surface energy [mN/m] |
|---|---|
| Control | 4.4 |
| IE2 | 4.0 |
| IE3 | 4.0 |
| IE4 | 4.6 |
| CE6 | 3.2 |
| CE8 | 3.1 |

From the results it is apparent that the polar component of the surface energy alters only slightly when using the inventive active ingredient combinations IE1 to IE4, whereas in the case of the noninventive, comparative examples CE6 and CE8 there is a marked reduction, which has adverse consequences for recoatability.

TABLE 5

Performance results on the adhesion

| Additive | Adhesion (fresh) | Adhesion after overbaking (30 min, 180° C.) |
|---|---|---|
| Control | GT 1 | GT 5 |
| IE2 | GT 1 | GT 1 |
| IE4 | GT 0 | GT 1 |
| CE7 | GT 1-2 | GT 2 |
| CE8 | GT 2 | GT 3 |

GT 0 very good adhesion-GT 5 poor adhesion

From the results it is apparent that in the case of the inventive active ingredient combinations IE2 and IE4, varnish adhesion is better in comparison to the noninventive, comparative examples CE7 and CE8.

TABLE 6

Performance results on the interlayer adhesion (pull-off test, AB = fracture of substrate to first layer/BC = fracture of first to second layer/XY = fracture of the adhesive)

| Additive | AB [%] | BC [%] | XY [%] |
|---|---|---|---|
| Control | 0 | 80 | 20 |
| IE2 | 95 | 5 | 0 |
| IE3 | 80 | 15 | 5 |
| IE4 | 90 | 10 | 0 |
| IE5 | 90 | 10 | 0 |
| CE6 | 70 | 30 | 0 |
| CE7 | 40 | 60 | 0 |
| CE8 | 0 | 95 | 5 |

From the results it is apparent that in the case of the inventive active ingredient combinations IE2 to IE5, in comparison to the noninventive, comparative examples CE6 to CE8, there is much better interlayer adhesion (evident from the high proportion of AB).

The invention claimed is:

1. A diamide-polyolefin wax mixture comprising
   (A) one or more diamides which possess a structure of the formula (I)

$$X^1—CO—NH—Y—NH—CO—X^2 \quad (I)$$

in which
   $X^1$ and $X^2$ are identical or different and are linear or branched, saturated or unsaturated hydrocarbon radicals having 3 to 29 carbon atoms, and at least one of the radicals $X^1$ and $X^2$ carries at least one hydroxyl group,
   Y is a divalent organic radical selected from the group consisting of aliphatic radicals having 2 to 26 carbon atoms, aromatic radicals having 6 to 24 carbon atoms or araliphatic radicals having 7 to 24 carbon atoms, and Y optionally comprises secondary or tertiary amino groups;
   (B) one or more carboxyl-containing polyolefin waxes having an acid number of 3 to 50 mg KOH/g; and optionally
   (C) one or more species selected from the group consisting of
   (i) one or more diamides not falling within the definition of (A), and
   (ii) one or more inorganic salts, metal oxides or semimetal oxides,
   where
   the one or more diamides (A), based on a total weight of the diamide-polyolefin wax mixture, are present in an amount of 20 wt % to 39 wt %,
   the one or more carboxyl-containing polyolefin waxes (B), based on the total weight of the diamide-polyolefin wax mixture, are present in an amount of more than 60 wt % up to 80 wt %, and
   the one or more species (C), based on the total weight of the diamide-polyolefin wax mixture, are present in an amount of 0 to 20 wt %, wherein
   (a) the diamide-polyolefin wax mixture at 25° C. is a particulate solid having a particle size distribution of 5 µm≤$d_{90}$≤100 µm, 1 µm≤$d_{50}$≤50 µm and 0.1 µm≤$d_{10}$≤20 µm, measured dry by means of laser diffraction technology,
   (b) the particles comprise (A) and (B) and, if (C) is present at more than 0 wt %, based on the total weight of the diamide-polyolefin wax mixture, (C) as well, and
   (c) a sum of the weight percentage fractions of the diamides (A) and (C)(i), based on the total weight of the diamide-polyolefin wax mixture, is less than 40 wt %.

2. The diamide-polyolefin wax mixture as claimed in claim 1, which consists of the one or more diamides (A), the one or more carboxyl-containing polyolefin waxes (B), and the one or more species (C).

3. The diamide-polyolefin wax mixture as claimed in claim 1, wherein a fraction of (A) the one or more diamides and (C)(i) the one or more diamides not falling within the definition of (A), based on the total weight of the diamide-polyolefin wax mixture, is 31 to 39 wt %.

4. The diamide-polyolefin wax mixture as claimed in claim 3, wherein a fraction of (C)(i) the one or more diamides not falling within the definition of (A), based on the total weight of the diamide-polyolefin wax mixture, is 0 to 10 wt %.

5. The diamide-polyolefin wax mixture as claimed in claim 1, wherein in the formula (I), $X^1$ is a $CH_3(CH_2)_5CH(OH)(CH_2)_{10}$ radical and $X^2$ is a radical selected from the group consisting of $CH_3(CH_2)_5CH(OH)(CH_2)_{10}$, $C_{15}H_{31}$, $C_{17}H_{35}$, $C_{17}H_{33}$, $C_9H_{19}$, $C_{11}H_{23}$, $C_7H_{15}$, and $C_5H_{11}$, and where at least 40 mol % of the radicals $X^2$ are a $CH_3(CH_2)_5CH(OH)(CH_2)_{10}$ group.

6. The diamide-polyolefin wax mixture as claimed in claim 1, wherein Y is selected from the group consisting of alkylene radicals having 2 to 8 carbon atoms and aralkylene radicals having 8 carbon atoms.

7. The diamide-polyolefin wax mixture as claimed in claim 1, wherein the one or more carboxyl-containing polyolefin waxes (B) are obtained (a) by oxidation of polyolefin waxes, (b) by oxidative degradation of polyolefin plastics, (c) by polymerization of olefins with carboxyl-containing or carboxylic anhydride-containing ethylenically unsaturated monomers, and/or (d) by grafting of carboxyl-containing or carboxylic anhydride group-containing ethylenically unsaturated monomers onto polyolefin waxes.

8. The diamide-polyolefin wax mixture as claimed in claim 1, wherein the one or more carboxyl-containing polyolefin waxes (B) is a polyethylene homopolymer or a polyethylene copolymer comprising at least 80 wt % of repeat ethylene units, based on a total weight of the polyethylene copolymer.

9. The diamide-polyolefin wax mixture as claimed in claim 1, wherein the one or more carboxyl-containing polyolefin waxes (B) have an acid number in a range from 10 to 25 mg KOH/g.

10. A process for preparing a diamide-polyolefin wax mixture as claimed in claim 1, comprising:
    i. mixing and homogenizing the one or more diamides (A), the one or more carboxyl-containing polyolefin waxes (B), and the one or more species (C) with one another to form a homogenized melt,
    cooling the homogenized melt to produce a solidified melt,
    iii. optionally first coarsely comminuting the solidified melt, and
    iv. subsequently grinding the solidified melt into a particulate diamide-polyolefin wax mixture which possesses the particle size distribution of 5 µm≤$d_{90}$≤100 µm, 1 µm≤$d_{50}$≤50 µm and 0.1 µm≤$d_{10}$≤20 µm, measured dry by means of laser diffraction technology.

11. A rheology control agent comprising the diamide-polyolefin wax mixture as claimed in claim 1.

* * * * *